United States Patent [19]

Barthelmes

[11] Patent Number: 4,803,368

[45] Date of Patent: Feb. 7, 1989

[54] ASSEMBLY AND METHOD FOR MONITORING THE LATERAL POSITION OF A BEAM OF IONIZING RADIATION

[75] Inventor: Norbert Barthelmes, Walnut Creek, Calif.

[73] Assignee: Siemens Medical Laboratories, Inc., Walnut Creek, Calif.

[21] Appl. No.: 138,759

[22] Filed: Dec. 28, 1987

[51] Int. Cl.[4] .................. G01T 1/185; G01T 1/29
[52] U.S. Cl. ...................... 250/385.1; 250/374; 250/397
[58] Field of Search ............. 250/385.1, 397, 374

[56] References Cited

U.S. PATENT DOCUMENTS

| | | | |
|---|---|---|---|
| 2,917,647 | 12/1959 | Fowler et al. | 250/374 |
| 3,808,441 | 4/1974 | Boux | 250/385.1 |
| 3,955,089 | 5/1976 | McIntyre et al. | 250/399 |
| 3,997,788 | 12/1976 | Boux | 250/385.1 |
| 4,131,799 | 12/1978 | Stieber | 250/385.1 |
| 4,206,355 | 6/1980 | Boux | 250/385.1 |

FOREIGN PATENT DOCUMENTS

| | | |
|---|---|---|
| 0040589 | 3/1985 | European Pat. Off. |
| 2218237 | 5/1979 | Fed. Rep. of Germany |
| 2402898 | 7/1979 | Fed. Rep. of Germany |
| 2221151 | 7/1980 | Fed. Rep. of Germany |
| 2526116 | 7/1986 | Fed. Rep. of Germany |

OTHER PUBLICATIONS

Blissett et al. "Development of a Prototype Tapered Cell Drift Chamber", Nuclear Instruments & Methods in Physics Research 228 (1984) Dec., No. 1, pp. 45–50.
Medical Physics Review Article, C. J. Karzmark, "Advances in Linear Accelerator Design for Radiotherapy", 1984, pp. 105 to 128.

Primary Examiner—Carolyn E. Fields
Attorney, Agent, or Firm—Lawrence C. Edelman

[57] ABSTRACT

A transmission ion chamber assembly for detecting the lateral displacement of an ionizing beam has two ion chambers located one behind the other along the beam axis. Each chamber contains two electrode plates and a spacer which separates and electrically insulates the electrodes from each other. The electrodes of each chamber are inclined with respect to each other along a preselected measuring axis. The axes of both chambers are perpendicular to the beam axis and to each other. In operation, the collector electrodes furnish current signals which depend upon the position of the beam along the associated measuring axis. With orthogonal chambers, i.e. measuring axes, the beam position in a plane perpendicular to the beam axis can be determined and aligned, e.g. via beam steering coils surrounding the beam.

9 Claims, 2 Drawing Sheets

ASSEMBLY AND METHOD FOR MONITORING THE LATERAL POSITION OF A BEAM OF IONIZING RADIATION

BACKGROUND OF THE INVENTION

The invention relates to a device and a method for monitoring a beam of ionizing radiation and, more particularly, to a beam steering system including a transmission ion chamber assembly for detecting the lateral position of such a beam.

In various applications, especially in radiotherapy, it is necessary to monitor the actual beam position and to correct any deviations from the intended beam position. To do this, a number of devices—called transmission ion chambers—have been developed.

For example, Medical Physics 11 (1984), pages 105 to 128, section VI.B., discloses a multi-chamber construction of five parallel plates alternately carrying high voltage (polarizing) electrodes and ion-trapping (collecting) electrodes. Each collecting electrode is divided into four sectors such that four distinct laminar collecting volumes are designed. By summing and subtracting the current signals of specific sector pairs, the beam dose and position are measured. For correcting misalignments, the position signals are used to energize beam steering coils grouped around an electron beam.

In European patent No. 40589, there is described a modified chamber assembly which, in relevant part, varies from the above mentioned chamber in that it uses only one collector electrode split up into eight segments.

In all of these chamber arrangements, the beam position is determined by sensing the differences between signals derived from different beam areas. The chamber must therefore be struck by a large beam cross-section, i.e. placed downstream of all the beam widening (and weakening) elements. As a result, the signal and in particular the signal to noise ratio are weak and require a sophisticated signal processing system to obtain an acceptable sensitivity. Moreover, the chamber cannot be utilized in instances where the radiation field is built up by scanning rather than spreading the beam. Further, because the chamber assembly contains a multitude of electrodes and provides a plurality of signals, it is mechanically complicated and large numbers of electronic components are required to produce it.

It is an object of this invention to provide a transmission ion chamber arrangement which generates strong signals with a relatively low noise level.

It is another object of this invention to provide a versatile transmission ion chamber assembly, capable of handling different kinds of beams (for example, electron or x-ray beams) and beam diameters (for example, swept or diffused beams).

It is a further object of this invention to provide a transmission ion chamber assembly which is simple and inexpensive to produce.

It is yet another object of this invention to provide a mechanically and electronically simple system for monitoring and correcting the position of an ionizing beam.

It is still another object of this invention to provide a simple and accurate method for measuring and correcting lateral misalignments of an ionizing beam.

It is yet another object of this invention to improve upon known beam steering systems of this type.

SUMMARY OF THE INVENTION

According to one broad aspect of the invention, a transmission ion chamber assembly for detecting the lateral displacement of an incident beam of ionizing radiation includes two chambers through which the beam passes, one after the other. Each chamber has an upstream base wall, a downstream base wall and a sidewall spacing both base walls; and contains a pair of electrodes, a collector electrode and an high voltage (HV) electrode. Both electrodes are separated from each other by a distance which varies gradually along a chamber-specific measuring axis and, preferably, over the entire electrode extension along this axis. When both chambers are in place, their measuring axes form angles with the beam path as well as between each other. Means are provided to extract from the collector electrodes current signals in dependence upon the beam position along the associated measuring axis.

The invention is based on the following effect. Each ion chamber contains gas which is ionized when hit by a beam of ionizing radiation. Gas electrons will migrate to the positive electrode, and the gas ions will be trapped at the negative electrode. The amplitude of the ion current, which is normally used to provide the signal, depends upon a variety of parameters, essentially the kind of ionizing radiation, the type of the filling gas, the gas pressure, the voltage drop between the electrodes and the irradiated gas volume. Since the full beam is intercepted by the electrodes, the cross-section of the irradiated gas volume corresponds to the beam cross-section and is therefore virtually constant. Thus, the current signal is basically a function of the distance between the electrodes and in practice, varies roughly linearly with it. Consequently, if, as here, the electrode distance varies along a certain axis, the signal amplitude reflects the beam position along this axis, so that by using two crossed chambers the beam position in a plane perpendicular to the beam axis may be detected.

In a preferred embodiment, the distance between the collecting electrode and the HV electrode varies linearly across the entire length of these electrodes, and the measuring axes extend perpendicular to the beam axis, as well as to each other.

One precondition for an accurate measurement is, as already mentioned, that the beam can strike the cell electrodes with its entire cross-section, regardless of the degree of its misalignment. This means that the electrodes are, preferably, at least twice as large as the beam cross-section. Yet, the chamber may still be more compact than conventional types, since it can be placed just downstream of the first beam-widening element.

All parts of the chamber assembly according to the present invention can be easily built and assembled. In the simplest case, the two chambers contain electrode plates, i.e. substrates coated with conductive layers, and share one electrode plate.

In cases where the monitored beam is produced by an electron beam, each current signal is typically processed such that it energizes a pair of steering coils located at opposite sides of the electron beam. To this end, there is, according to another aspect of the invention, provided a signal processing unit in which each current signal is first amplified in an amplifier and than subtracted from a reference signal in a comparator. The reference signal is furnished by a reference signal source; its value corresponds to the amplitude the amplified signal would have if the beam were centered.

The comparator output signal, which is indicative of the beam misalignment along the associated measuring axis, is fed into a driver unit which controls the current through the pair of steering coils.

According to a further aspect of the invention, there is provided a method for detecting the lateral displacement of a beam of ionizing radiation. The first step of this method is to direct the beam through two activated transmission ion chambers, each containing a collecting electrode and a high voltage electrode. The distance between both electrodes varies gradually along a chamber-specific measuring axes, and both axes are perpendicular to the beam axis as well as to each other. Then, current signals are derived from the collector electrodes. These signals correspond to the beam position along the associated measuring axis. This method could be expanded to correct beam misalignments by simply transforming each current signal into an error signal which is indicative of the beam displacement along the associated measuring axis, and by using this error signal to energize a pair of beam steering coils surrounding the beam.

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENT

For the sake of clarity, parts essentially known per se are depicted schematically. Throughout the drawings, like elements are designated with the same numerals.

Figure 1:
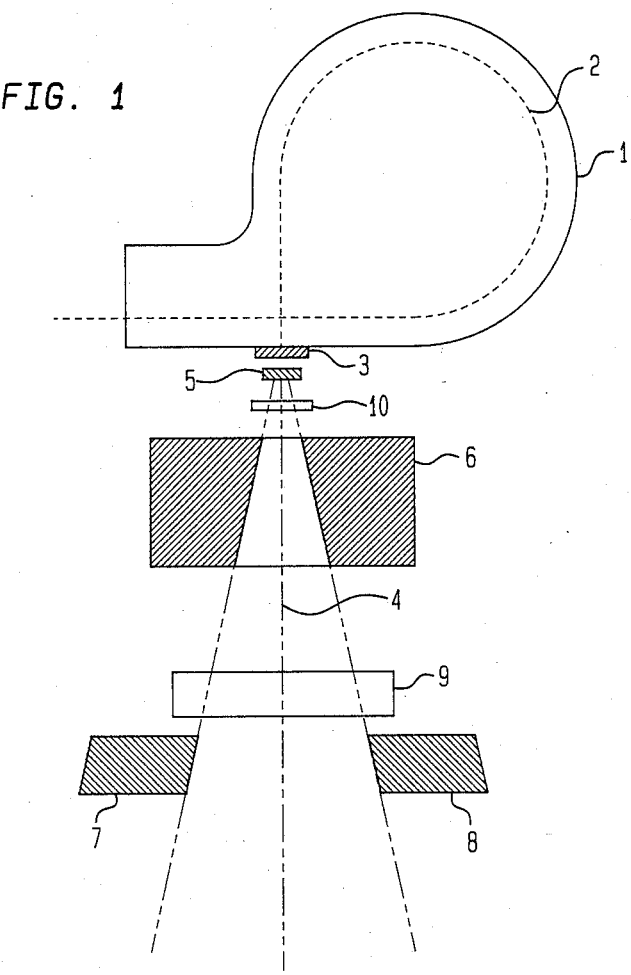
FIG. 1 is a cross-section of the beam-defining part of a linear electron accelerator (LINAC) containing an embodiment of the invention.

FIG. 1 shows a LINAC with a bending magnet 1 which projects an electron beam 2 through a window 3 along a beam axis 4. The beam, which is actually pulsed with a pulse length of several usec and a pulse repetition rate of a few milliseconds, has a diameter of about 1 millimeter and comprises electrons in the range of 10 MeV. After passing window 3, beam 2 hits a target 5 which produces an x-ray beam. This beam is shaped in a shielding block 6 and in a jaw system comprised of two pairs of opposite jaws 7, 8 and 9. Between target 5 and shielding block 6 there is disposed a chamber assembly 10.

Figure 2:
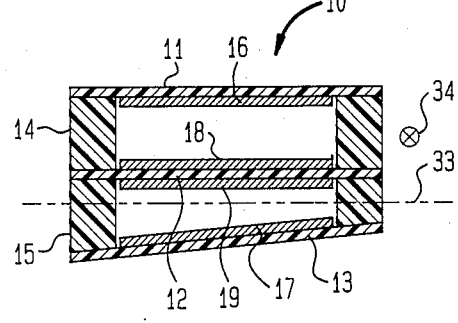
FIG. 2 is a cross-section of the chamber assembly of FIG. 1, taken along the drawing plane.
Figure 3:
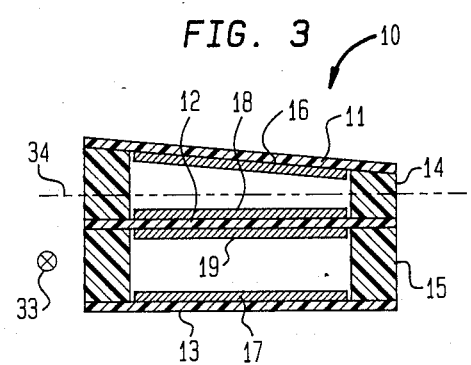
FIG. 3 is a cross-section of the chamber assembly of FIG. 1, along a plane perpendicular to the drawing plane.

Chamber assembly 10 comprises, as shown in FIGS. 2 and 3, three plates 11, 12 and 13. These plates are spaced from each other by spacer rings 14, 15. The outer plates are tilted against the central plate so that their distance varies linearly along measuring axes 33 and 34, respectively. Both axis are, as can be seen from the figures, orthogonal to each other in a plane perpendicular to the beam axis 4. Outer plates 11, 13 are coated on their inner sides with conductive layers serving as collecting electrodes 16, 17, and the central plate 12 carries on each side a conductive layer each serving as a high voltage electrode 18, 19.

Each part of chamber assembly 10 can be made of conventional material. The plates may consist of a polyester known under the trademark Capton and may have a thickness of several mil. The electrodes may be sputtered gold layers and may be circular. The cell defined by the Plates and spacer rings may be filled with air. Such an assembly has a very low self-absorption for gamma rays as well as electron beams. To prevent the polyester foils from being bent, i.e. the distances between corresponding electrodes from being altered, by atmospheric temperature and/or pressure changes, the cells communicate with the environment through (not shown) openings in the spacer rings. Any fluctuations in these parameters are electronically compensated. The means by which this is achieved is known to persons skilled in the art and has therefore not been shown.

Figure 4:
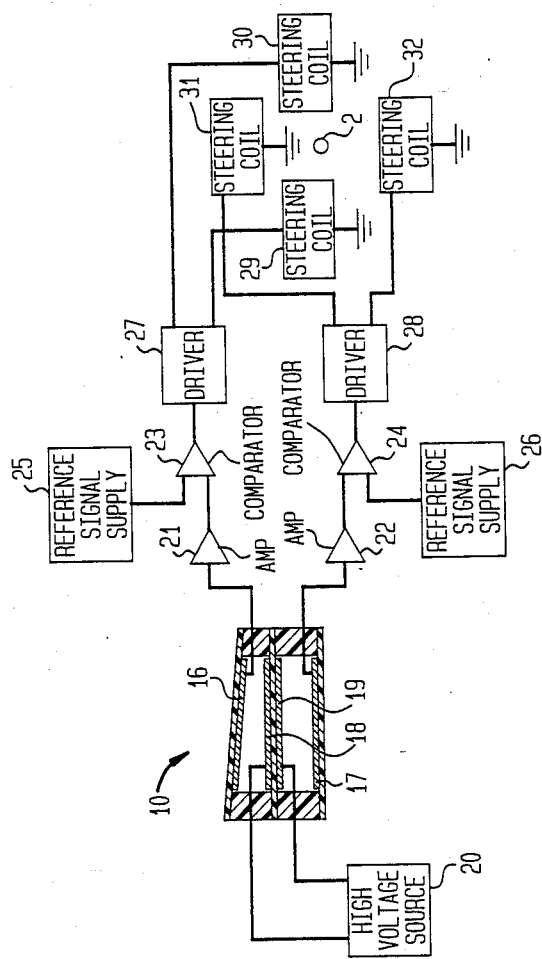
FIG. 4 is a block diagram showing a complete beam monitoring and steering system according to the invention.

The chamber assembly is part of a feed-back system for correcting the beam position. In this system, which is outlined in FIG. 4, the HV electrodes 18, 19 are connected to a high voltage source 20. The signals which are derived from the collecting electrodes 16, 17 and represent the amount of ions produced by one of the beam pulses, are amplified in amplifiers 21, 22 and then subtracted from reference signals in comparators 23, 24. The reference signals are furnished by reference signal supplies 25 or 26. The value of the reference signals equals the amplitude the amplified signals would have in case the beam were aligned. They depend upon the actual beam intensity which is independently measured and communicated to the supplies 25, 26. The difference between the amplified signal and the reference signal controls, via a driver stage 27, 28, the current in a pair of steering coils 29, 30, 31 and 32 which are located on opposite sides of the electron beam 2 before it is diverted in the bending magnet 1. This current creates at the beam a transverse magnetic field which exerts a correcting force perpendicular to the beam axis and the field direction. It is varied such that the difference signal disappears, i.e. the beam becomes aligned.

Having thus described the invention with particular reference to a preferred form thereof, it will be obvious to those skilled in the art to which the invention pertains, after understanding the invention, that various changes and modifications may be made therein without departing from the spirit and scope of the invention as defined by the claims appended hereto. For example, an electron rather than an x-ray beam could be monitored. In this case, the incident beam is much more intensive but also spread over a larger solid angle so that the gas could, if necessary, easily be kept below its saturation region, for example by lowering the high voltage. Further, in some instances it is preferable to have the distance between corresponding electrodes vary according to a non-linear function or with a profile having an extremum at the ideal beam position. The latter does not require a reference signal and affords a simple measurement of the overall beam intensity. It is also possible to use the electrons rather than the ions of the ionized gas for generating the current signal.

I claim:

1. A transmission ion chamber assembly for detecting the lateral displacement of an incident beam of ionizing radiation, said beam being projected along a beam axis, comprising:

(a) two ion chambers located one behind the other, each chamber having two base walls and a side wall extending therebetween;

(b) a pair of electrodes disposed in each chamber, each of said electrode pairs including a collecting electrode and a high voltage electrode, the electrodes of each pair being larger than the cross-section of the incident beam and being separated by a distance which varies gradually along a specific measuring axis, the measuring axes of both chambers being inclined with respect to each other; and (c) means for deriving from each collecting electrode a current signal as a function of the position of said beam along the associated measuring axis.

2. A chamber assembly according to claim 1, wherein the distance between both electrodes of each chamber varies linearly along the measuring axis.

3. A chamber assembly according to claim 1, wherein the distance between both electrodes of each chamber varies over the entire electrode extension along the associated measuring axis.

4. A chamber assembly according to claim 1, wherein said electrodes are at least twice as large as the cross-section of the incident beam.

5. A chamber assembly according to claim 1, wherein said electrodes are circular.

6. A chamber assembly according to claim 1, further including two central plates and two outer plates, each central plate being the base wall in a corresponding one of the chambers and each outer plate being the other base wall in a corresponding one of the chambers, and wherein each of the outer plates carries on its inner side one of said electrodes and the inner plate carries on each of its sides one of said electrodes.

7. A system for detecting and correcting the lateral displacement of an incident electron beam which is projected along a beam axis, comprising:

a transmission ion chamber assembly including (a) two ion chambers located one behind the other along the beam axis, each chamber having two base walls and a side wall extending therebetween;

(b) a pair of electrodes disposed in each chamber, each of said electrode pairs including a collecting electrode and a high voltage electrode, the electrodes of each pair being larger than the cross-section of the incident beam and being separated by a distance which varies gradually along a specific measuring axis, the measuring axes of both chambers being inclined with respect to the beam axis and each other; and (c) means for deriving from each collecting electrode a current signal as a function of the position of said beam along the associated measuring axis;

two pairs of steering coils, the coils of each coil pair being disposed on opposite sides of the electron beam; and a signal processing unit including for each chamber (a) an amplifier for amplifying the current signal derived from said chamber;

(b) a reference signal supply for furnishing a reference signal;

(c) a comparator for comparing the amplified current signal with the reference signal and producing an error signal which represents a result of said comparison; and (d) a drive for controlling the current through one of the coil pairs, said drive being activated by said error signal.

8. A linear electron accelerator, comprising:

means for producing a beam of ionizing radiation from an electron source;

a collimator collimating the beam of ionizing radiation; and a transmission ion chamber assembly disposed between said means and said collimator, said chamber assembly including (a) two ion chambers located one behind the other along the beam axis, each chamber having two base walls and a side wall extending therebetween;

(b) a pair of electrodes disposed in each chamber, each of said electrode pairs including a collecting electrode and a high voltage electrode, the electrodes of each pair being larger than the cross-section of the incident beam and being separated by a distance which varies gradually along a specific measuring axis, the measuring axes of both chambers being inclined with respect to the beam axis and each other; and (c) means for deriving from each collecting electrode a current signal as a function of the position of said beam along the associated measuring axis.

9. A method for detecting the lateral displacement of a beam of ionizing radiation, comprising the steps of (a) directing the beam through a first ion chamber and a second ion chamber, each chamber having a collecting electrode and a high voltage electrode separated by a distance which varies gradually along a chamber-specific measuring axis, wherein the measuring axes of both chambers are perpendicular to the beam axis and to each other;

(b) applying a voltage drop across the electrodes of each ion chamber; and (c) deriving from each collecting electrode a current signal which represents the position of the incident beam along the associated measuring axis.

* * * * *